United States Patent [19]
Shirie

[11] Patent Number: 5,130,851
[45] Date of Patent: Jul. 14, 1992

[54] ZOOM LENS DEVICE

[75] Inventor: Nobuyuki Shirie, Omiya, Japan

[73] Assignee: Fuji Photo Film Co., Ltd., Kanagawa, Japan

[21] Appl. No.: 637,712

[22] Filed: Jan. 7, 1991

[30] Foreign Application Priority Data

| Jan. 16, 1990 | [JP] | Japan | 2-006926 |
| Jan. 16, 1990 | [JP] | Japan | 2-006927 |
| Jan. 16, 1990 | [JP] | Japan | 2-006928 |
| Jan. 16, 1990 | [JP] | Japan | 2-006929 |
| Jan. 16, 1990 | [JP] | Japan | 2-006930 |
| Feb. 16, 1990 | [JP] | Japan | 2-035524 |

[51] Int. Cl.⁵ .................................. G02B 15/00
[52] U.S. Cl. .................... 359/700; 359/695; 359/823; 354/195.12
[58] Field of Search .............. 359/700, 693, 823, 695, 359/699, 696, 825, 826, 701; 354/195.12, 270

[56] References Cited

U.S. PATENT DOCUMENTS

| 3,610,733 | 10/1971 | Back | 359/700 |
| 4,596,449 | 6/1986 | Iwata et al. | 359/700 |
| 4,865,433 | 9/1989 | Okajima et al. | 359/700 |

Primary Examiner—Loha Ben
Attorney, Agent, or Firm—Sughrue, Mion, Zinn Macpeak & Seas

[57] ABSTRACT

A zoom lens device is disclosed which is ideal for use in a video camera. In the zoom lens device, a zoom ring is provided directly in the rear end of a cam barrel without using any connecting pins, and the zoom ring is exposed out from a fixed barrel so that it can be operated from externally. For this reason, there is eliminated the need for provision of an escape groove for the connecting pins in the fixed barrel and thus the angles of cam grooves can be increased up to a limit beyond which the cam grooves may interfere with each other. As a result of this, a zoom lens device which is compact and is of a high magnification can be realized.

10 Claims, 9 Drawing Sheets

ZOOM LENS DEVICE

BACKGROUND OF THE INVENTION

1. Field of the Invention

The present invention relates to a zoom lens device and, in particular, to a zoom lens device which is ideal for use in a video camera or the like.

2. Description of the Related Art

Conventionally, there has been known a zoom lens device using a zoom lens barrel having a zooming mechanism of a taking lens which moves back and forth first and second zoom lens groups to thereby perform a zooming operation. In such zoom lens barrel, a connecting pin is planted on a cam barrel which is rotatably supported inside of a fixed barrel, the connecting pin is fitted into a zoom ring, and the zoom ring is then rotated to thereby achieve the zooming operation. Gears, which are used to transmit a force from a motor, are formed integrally with the zoom ring. In this type of zoom lens barrel, it is necessary to form a clearance groove in the fixed barrel supporting the cam barrel in such a manner that the groove corresponds to an angle of rotation of the connecting pin.

On the other hand, in the case when a zoom mechanism of a high magnification is used, the quantity of lens groups to be moved by a cam barrel is increased as the magnification becomes higher. In general, the relative positions of first and second zoom lens groups are determined in an optical design manner. Then, in order to increase the quantity of movement of the lens groups with the same cam barrel diameter, an angle of the rising of a cam groove must be great. However, if this angle is great, then a force for driving the lenses is increased and also a quantity of shifting of the zoom lens group in the optical axis direction due to play between a groove and a pin fittable into the groove is increased.

Therefore, conventionally, the angle of the groove in the cam barrel must be as small as possible. In this situation, in order to make the angle small to thereby secure a great quantity of movement, the angle of zoom rotation must be great or the diameter of the cam barrel must be increased to thereby increase the length of the cam groove, which gives rise to a problem that the zoom lens barrel itself is large in size.

Also, in the above-mentioned conventional zoom lens barrel, a guide hole and a recessed portion for prevention of swinging are formed in the first moving lens frame, whereby a first guide bar is fitted into the guide hole to guide the first moving lens frame and a commonly used swing-preventive bar is fitted into the swing-preventive recessed portion to prevent the swinging of the first moving lens frame. Further, a guide hole and a recessed portion for prevention of swinging are formed in the second moving lens frame, whereby a second guide bar is fitted into the guide hole to guide the second moving lens frame and the above-mentioned common swing-preventive bar is fitted into the swing-preventive recessed portion to prevent the swinging of the second moving lens frame. In addition, in the second moving lens frame there is provided a recess for prevention of interference with the first guide bar, and in the first lens frame there is provided a recess for prevention of interference with the second guide bar.

However, in the above-mentioned conventional zoom lens barrel, the swing-preventive bar is required besides the first and second guide bars and the recessed portions for prevention of interference must be worked in the first and second lens frames, respectively. Due to this, the conventional zoom lens barrel is disadvantageous in that it requires a large number of parts and a great number of man-hour for working.

In a zoom lens barrel used in a conventional video camera, in general, a front-lens focusing system is employed and an iris diaphragm is fixed between a zoom lens group and a master lens group.

However, when the front-lens focusing system is employed, a front lens is drawn out when focusing is executed and, therefore, in order to obtain a great angle of view on the side of a wide angle lens, the diameter of the front lens must be greater and thus the weight of the whole video camera becomes heavier. Also, when the iris diaphragm is interposed and fixed between the zoom lens and master lens, the zoom lens barrel must be larger in size in order to obtain a high magnification.

A focus lens of an automatic focusing system is driven and brought into focus by a motor in accordance with an AF signal. In such drive mechanism for driving the focus lens of an automatic focusing system, for example, the output shaft of the motor is connected to a threaded shaft with which a nut member is threadedly engaged. In such structure, if the threaded shaft is rotated, then the nut member is also rotated together with the threaded shaft and, for this reason, restriction means must be provided in order to prevent the rotation of the nut member. For example, there is known rotation preventive means in which a pin is planted on and projected from the nut member and the pin is fitted into an elongated groove formed in a main body of a video camera or the like to thereby prevent the rotation of the nut member.

On the other hand, if there exists any play between the nut member and the lens frame, then the back-and-forth movement of the lens frame cannot be achieved with accuracy. However, if no play is present therebetween, then there arises another problem; that is, there are required position precision conditions such as parallelism between the lens frame and the nut member and the like. Such precision becomes severer as the quantity of the movement of the lens frame is increased. As an example of the solutions to such problem, there is known a method in which such play is biased by a torsion spring to thereby absorb the positional shifting between the lens frame and the nut member while the lens frame can be moved back and forth with accuracy.

In the above-mentioned structure, if the threaded shaft is rotated, then the nut member is moved back and forth and, with the back-and-forth movement of the nut member, the moving lens frame is moved back and forth along the guide bar. Since the nut member and moving lens frame are in engagement with each other with the pin and projection piece being in contact with each other, the shifting occurring between the threaded shaft and the guide bar of the moving lens frame can be absorbed.

However, due to the need of the torsion spring, the above-mentioned conventional lens drive device has a problem that it is not easy to assemble.

Conventionally, there is also known a zoom lens barrel which includes a zoom lens drive mechanism and a focus lens drive mechanism. The zoom lens drive mechanism includes a moving lens frame which can be guided and thus can be moved back and forth by a guide bar to perform a zooming operation. On the other hand, in the focus lens drive mechanism there is provided a moving lens frame which can be guided and moved back and forth by a guide bar to perform a focus adjustment.

However, in the conventional zoom lens barrel, the moving lens frame of the zoom lens system and the moving lens frame of the focus lens system are guided by separate guide bars, respectively. Due to this, the conventional zoom lens barrel is disadvantageous in that it has some trouble in adjusting the optical axes of the zoom and focus lens systems. Also, the separate provision of the guide bars in the focus and zoom lens systems results in the increased number of parts.

In an ordinary taking lens barrel, there are used parts which are referred to as glittering members. For example, in a taking lens barrel of a type that rotates a cam barrel to thereby move a zoom lens back and forth, there are employed a follower pin, which is planted on and projected from a lens frame and can be fitted into a cam groove in the cam barrel, a guide bar provided in the lens frame and the like, all of which are plate treated and thus are easy to glitter.

In view of this, in the above conventional taking lens barrel, the inner surface of the barrel is coated with paint for flattening and also a light shield surface is formed in the inner surface of the barrel to prevent the reflection of the barrel inner surface. However, this results in the complicated working of the inner surface of the taking lens barrel.

SUMMARY OF THE INVENTION

The present invention aims at eliminating the drawbacks found in the above-mentioned prior art zoom lens barrels.

Accordingly, it is an object of the invention to provide a zoom lens barrel which can be made compact and is capable of providing a high magnification.

In order to achieve the above object, according to the invention, there is provided a zoom lens barrel which comprises: a fixed barrel; a cam barrel having first and second cam grooves and supported rotatably within the fixed barrel; a first lens frame having a first follower pin fittable into the first cam groove in the cam barrel and movable back and forth by means of the rotation of the cam barrel; a second lens frame having a second follower pin fittable into the second cam groove in the cam barrel and movable back and forth by means of the rotation of the cam barrel; and a zoom ring fixedly secured to the rear end of the cam barrel and exposed out from the fixed barrel disposed outside.

According to the present invention, the zoom ring for driving a zoom lens is secured directly to the rear end of the cam barrel to thereby eliminate the need for provision of a connecting pin, so that the zoom lens barrel can be made more compact than the above-mentioned prior art zoom lens barrels.

Also, according to the present invention, since there is eliminated the need to form a clearance groove at a position corresponding to the cam grooves in the fixed barrel, the angles of the cam grooves can be increased up to a critical angle at which the cam grooves interfere with each other.

It is another object of the invention to provide a zoom lens barrel which requires a reduced number of parts as well as a reduced number of working man-hour.

In order to attain the above object, according to the invention, there is provided a zoom lens barrel which comprises: a fixed barrel; a cam barrel having first and second cam grooves and supported rotatably by the fixed barrel; a first lens frame having a first follower pin fittable into the first cam groove in the cam barrel and movable back and forth by means of the rotation of the cam barrel; a second lens frame having a second follower pin fittable into the second cam groove in the cam barrel and movable back and forth by means of the rotation of the cam barrel; a first guide bar mounted to the fixed barrel in the axial direction thereof for fitting into a guide hole formed in the first lens frame and for fitting into a swing-preventive recessed portion formed in the second lens frame; and a second guide bar mounted to the fixed barrel in the axial direction thereof for fitting into a guide hole formed in the second lens frame and for fitting into a swing-preventive recessed portion formed in the first lens frame.

According to the present invention, the first guide bar is used to guide the first lens frame as well as to prevent the swinging of the second lens frame, and the second guide bar is used to guide the second lens frame as well as to prevent the swinging of the first lens frame, whereby there is eliminated the need for provision of a bar used specially for swinging prevention and there is also eliminated the need for working of the recessed portions.

It is still another object of the invention to provide a zoom lens barrel which is compact and is capable of obtaining a high magnification.

In order to accomplish the above object, according to the invention, there is provided a zoom lens barrel which comprises: a fixed barrel; a first fixed lens group disposed in the front portion of the fixed barrel; a first zoom moving lens group disposed in the rear of the first fixed lens group and within the fixed barrel such that it is free to move back and forth; a second zoom moving lens group disposed in the rear of the first zoom moving lens group and within the fixed barrel such that it is free to move back and forth; a diaphragm member disposed on the front surface of the second zoom moving lens group and movable together with the second zoom lens moving lens group; a focus moving lens group disposed in the rear of the second zoom moving lens group and within the fixed barrel such that it is free to move; and, a second fixed lens group disposed in the rear of the focus moving lens group and within the fixed barrel According to the present invention, the diaphragm member is disposed on the front surface of the second zoom moving lens and can be moved back and forth together with the second zoom moving lens group, so that the present zoom lens barrel can be made compact and can also obtain a high magnification. Also, an inner focus system is employed and the focus moving lens group is interposed between the zoom lens group and the second fixed lens group, so that a high magnification can be obtained.

It is a further object of the invention to provide a lens drive device which has a simple structure without using any torsion spring.

In order to achieve this object, according to the invention, there is provided a lens drive device which comprises: a motor; a threaded shaft connected to the motor; a nut member threadedly engageable with the threaded shaft and having a fork-like engagement portion; and a moving lens frame having a spherical portion fittable to the fork-like engagement portion of the nut member in a spherical contact manner, the moving lens frame being guidable by a guide bar.

According to the present invention, the spherical portion of the moving lens frame is engageable with the fork-like engagement portion of the nut member. For this reason, the nut member and the moving lens frame can be brought into engagement with each other without using any torsion spring. In addition to this, since the surfaces of the two members are in contact with each other, any shifting in parallelism between the guide bar of the moving lens frame and the threaded shaft can be absorbed. Also, due to the engagement of the fork-like engagement portion of the nut member with the moving lens frame, the nut member can be prevented from rotation.

It is a still further object of the invention to provide a zoom lens barrel which requires a reduced number of parts and is capable of adjusting the optical axes of a zoom lens system and a focus lens system with ease.

In order to attain the above object, according to the invention, there is provided a zoom lens barrel which comprises: a fixed barrel; a zoom lens system movable back and forth within the fixed barrel by means of a guide bar to perform a zooming operation; and a focus lens system movable back and forth within the fixed barrel by means of the guide bar of the zoom lens system to perform a focus adjusting operation.

According to the present invention, the moving lens frame of the focus lens system is guided by the guide bar of the zoom lens system. Thanks to this, the optical axes of the zoom and focus lens systems can be adjusted with ease and the common use of the guide bar results in the reduced number of parts.

It is a yet further object of the invention to provide a taking lens barrel which which is simplified in structure and also is capable of preventing generation of flare.

In order to accomplish this object, according to the invention, there is provided a taking lens barrel which comprises: a fixed barrel; a cam barrel having a cam groove and supported rotatably by the fixed barrel; a lens frame having a follower pin fittable into the cam groove of the cam barrel, and movable back and forth by means of rotation of the cam barrel; and a guide bar mounted in the axial direction of the fixed barrel and fittable into a guide hole in the lens frame to guide the lens frame; wherein the follower pin and the guide bar are disposed in a vertical direction, a fixed diaphragm piece is formed in the upper and lower portions of the front surface of the fixed barrel, and one end of the guide bar is supported by the fixed diaphragm piece.

According to the present invention, the guide bar, follower pin and the like are disposed in the upper and lower portions of the taking lens and the fixed diaphragm piece is formed in the upper and lower portions of the front surface of the taking lens barrel, so that entrance of excessive light can be prevented by the fixed diaphragm piece. The fixed diaphragm piece cuts upper and lower photographing lights as well but, however, since an image pickup element is disposed long from side to side, there arises no problem even if the upper and lower photographing lights are cut.

Also, due to the fact that the fixed diaphragm piece supports the guide bar, the number of parts necessary can be reduced.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of a zoom lens device according to the present invention with reference to the accompanying drawings.

Figure 1:
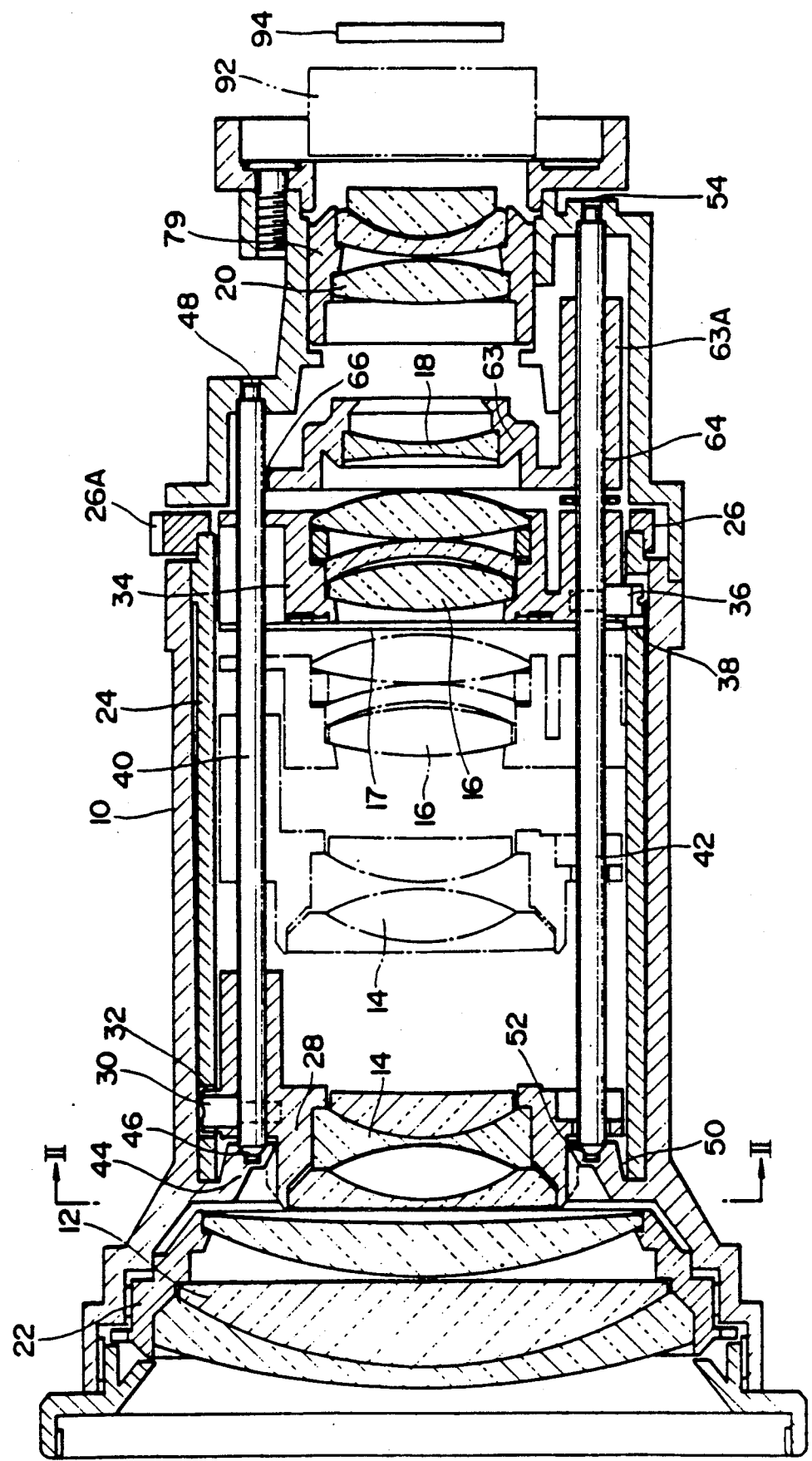
FIG. 1 is a section view of the structure of a zoom lens barrel according to the invention.

Referring first to FIG. 1, there is shown a zoom lens barrel to which the present invention is applied. In FIG. 1, a fixed barrel 10 includes therein five lens groups, that is, a first fixed lens group 12, a first zoom moving lens group 14, a second zoom moving lens group 16, a focus moving lens group 18, and a second fixed lens group 20. Also, in front of the second zoom moving lens group 16, there is provided a diaphragm plate 17.

The first fixed lens group 12 is fixed to the front portion of the fixed barrel 10 via a lens frame 22. In the central inner portion of the fixed barrel 10 there is supported a cam barrel 24 in such a manner that it can be rotated freely. The cam barrel 24 is arranged such that it can be given a rotational driving force from a motor (which is not shown) through a zoom ring 26 provided in the rear end portion of the cam barrel 24.

Figure 7:
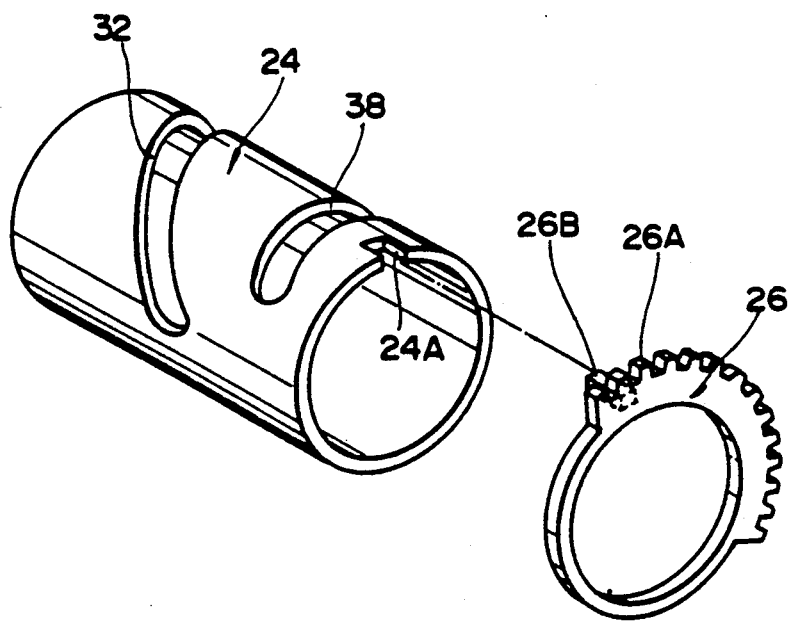
FIG. 7 is a perspective view of a structure for mounting a zoom ring.

In FIG. 7, there is shown a mounting structure for mounting the above-mentioned zoom ring 26. As shown FIG. 7, the zoom ring 26 includes gears 26A formed in a manner to extend substantially over a half of the periphery thereof. The gears 26A are connected to a motor (not shown) to a gear transmission mechanism (which is not shown). The zoom ring 26 further includes a projecting piece 26B in the front surface thereof. On the other hand, the cam barrel 24 includes a notch 24A formed in the rear end portion thereof to correspond to the projecting piece 26B. The notch 24A serves as a working reference for cam grooves 32, 38. By fitting the projecting piece 26B into the notch 24A in the cam barrel 24, the zoom ring 26 can be fixed to the rear end portion of the cam barrel 24. It should be noted here, however, that the mounting of the zoom ring 26 may be achieved by use of caulking means, by forming the zoom ring integrally with the cam barrel 24, or by other similar ways. In either case, as shown in FIG. 1, it is necessary that the gears 26A of the zoom ring 26 are exposed out from the fixed barrel 10 which is disposed outside of the zoom ring so that the zoom ring can be operated externally.

The first zoom moving lens group 14 is mounted to a first lens frame 28. From the top portion of the first lens frame 28 there is projected a plated follower pin 30. The follower pin 30 is fitted into the cam groove 32 formed in the cam barrel 24. On the other hand, the second zoom moving lens group 16 is mounted to a second lens frame 34. From the bottom portion of the second lens frame 34 there is projected a plated follower pin 36, which is fitted into the cam groove 38 formed in the cam barrel 24.

Figure 2:
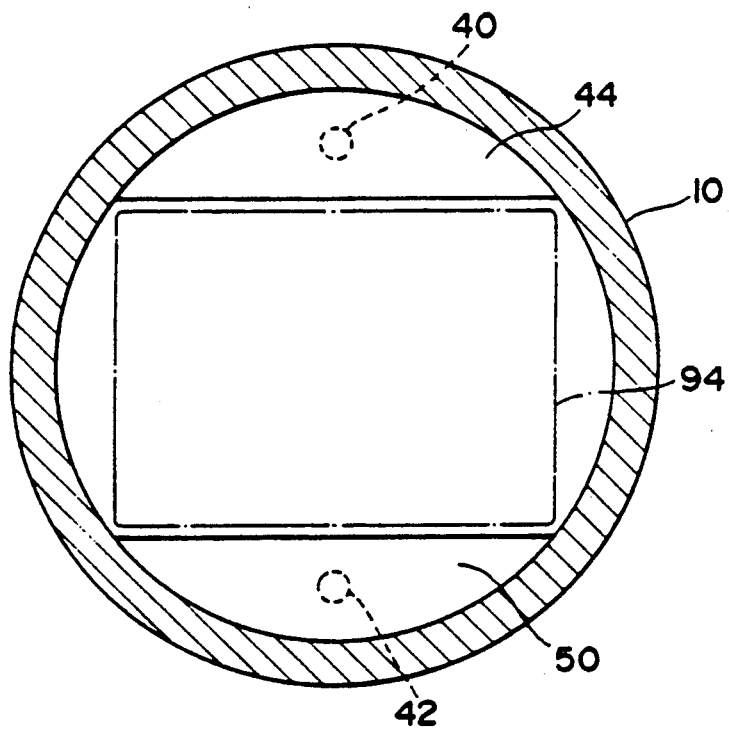
FIG. 2 is a section view taken along the line II-II in FIG. 1, showing the shape of the front surface of the zoom lens barrel in FIG. 1.

The fixed barrel 10 includes in the upper portion thereof a first plated guide bar 40 which extends in the axial direction of the fixed barrel 10. The fixed barrel 10 further includes in the lower portion thereof a second guide bar 42. The front end portion of the first guide bar 40 is fitted into and supported by a hole 46 formed in a support piece 44 which is disposed on the upper portion of the front surface of the fixed barrel 10, and the rear end portion of the first guide bar 40 is fitted into and supported by a hole 48 formed in the stepped portion of the fixed barrel 10. On the other hand, the front end portion of the second guide bar 42 is fitted into and supported by a hole 52 formed in a support piece 50 which is disposed in the lower portion of the front surface of the fixed barrel 10 and the rear end portion of the second guide bar 42 is fitted into and supported by a hole 54 formed in the rear end portion of the fixed barrel 10. The support pieces 44 and 50 for supporting the first and second guide bars 40 and 42 provided in the fixed barrel 10, as shown in FIG. 2, are disposed in the upper and lower portions of the fixed barrel 10, respectively, so as to form a fixed diaphragm piece. This prevents entrance of unnecessary light to thereby prevent glittering of parts such as the follower pins 30, 36 and the like. The support pieces 44 and 50 shield part of an object light but, as shown in FIG. 2, since a CCD 94 is disposed long from side to side, the object light that is shielded by the support pieces 44, 50 is originally prevented from entering the CCD 94. For this reason, the shielding of part of the object light has no ill effects on photographing.

Figure 3:
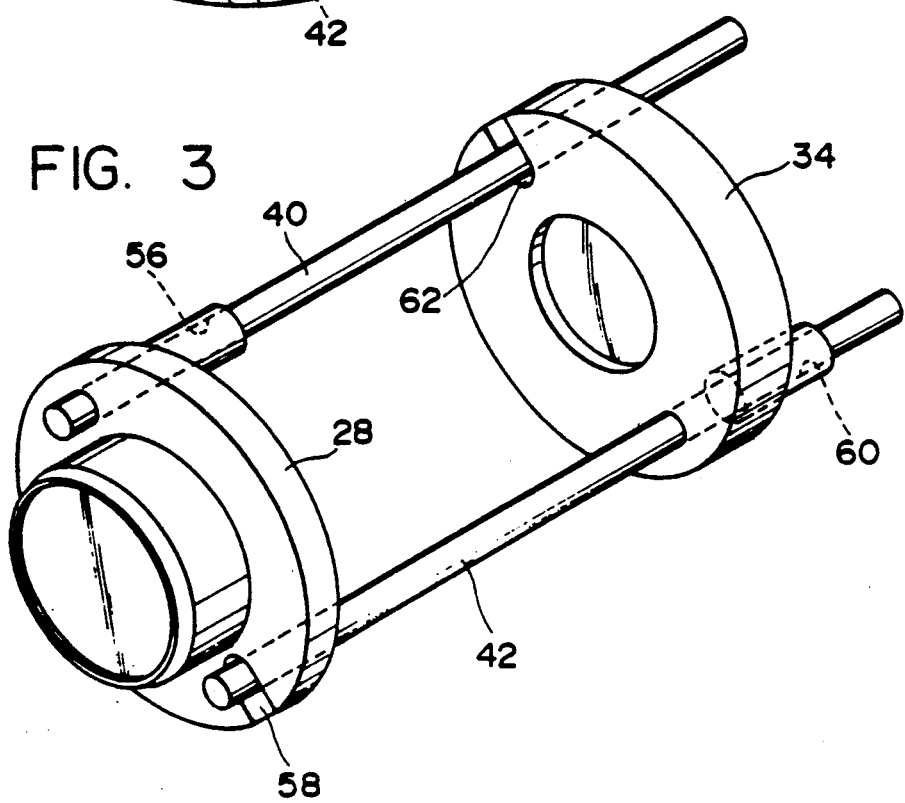
FIG. 3 is a perspective view showing a relationship between a zoom lens frame and a guide bar.

In FIG. 3, there is shown a relationship between the first zoom lens frame 28, second zoom lens frame 34, and the first and second guide bars 40, 42. In other words, the first guide bar 40 can be inserted into a guide hole 56 formed in the upper portion of the first zoom lens frame 28 so that the first zoom lens frame 28 can be inserted in the forward and backward direction by the first guide bar 40. The second guide bar 42 can be inserted into a swing-preventive recessed portion 58 formed in the lower portion of the first zoom lens frame 28 to thereby be able to prevent swinging of the first zoom lens frame 28. Due to this, if the cam barrel 24 is rotated in this condition, then the first zoom lens frame 28 is moved back and forth while it is being guided by the guide bars 40 and 42. On the other hand, in the lower portion of the second zoom lens frame 34 there is formed a guide hole 60 and the second guide bar 42 can be inserted into this guide hole 60. Also, in the upper portion of the second zoom lens frame 34 there is formed a swing preventive recessed portion 62 into which the first guide bar 40 is inserted. Due to this, if the cam barrel 24 is rotated in this condition, then the second zoom lens frame 34 is moved back and forth while it is being guided by the guide bars 40 and 42. In this manner, the first guide bar 40 can be inserted into the guide hole 56 in the first zoom lens frame 28 to thereby guide the first zoom lens frame 28, and at the same time the first guide bar 40 can be positioned in the recessed portion 62 in the second zoom lens frame 34 to thereby prevent swinging of the second zoom lens frame 34. The second guide bar 42 guides the hole 60 in the second zoom lens frame 34 and also can serve as a swing-preventive member for the first zoom lens frame 28. For these reasons, when compared with a zoom lens barrel according to the prior art, the present zoom lens barrel is advantageous in that it can reduce the number of parts and the number of working man-hour.

As shown in FIG. 1, the focus moving lens group 18 is mounted to a lens frame 63 and the second guide bar 42 is inserted into a guide hole 64 formed in the lower portion 63A of the lens frame 63. Also, in the upper portion of the focus lens frame 63 there is formed a recessed portion 66, into which recessed portion 66 the first guide bar 40 is inserted to thereby be able to prevent swinging of the focus lens frame 63. Due to the fact that the focus lens frame 63 uses the guide bars 40 and 42 of the zoom lens system in common, it is easy to align the optical axis of the zoom lens system with the optical axis of the focus lens system and at the same time the number of parts can be reduced advantageously.

Figure 4:
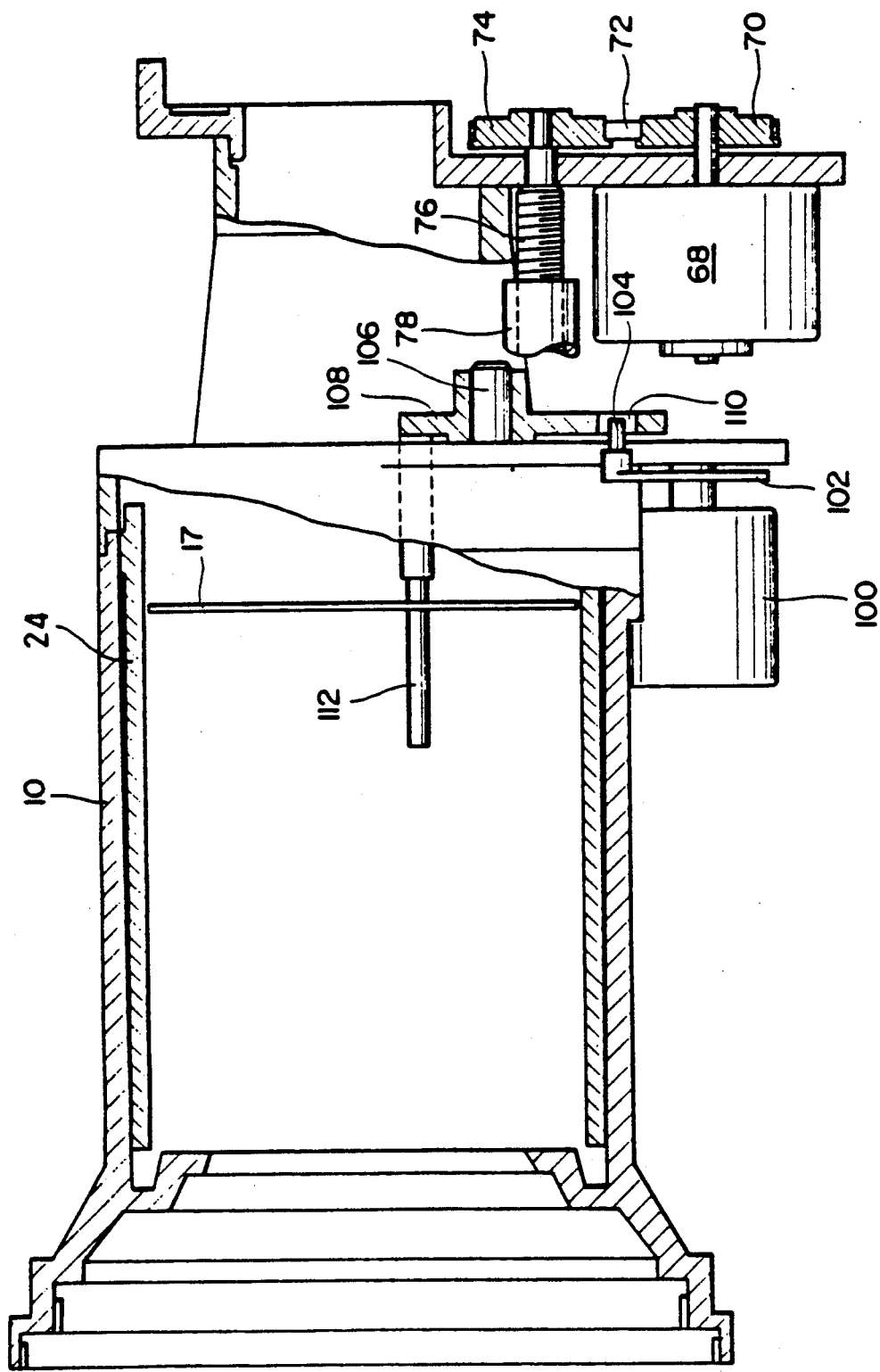
FIG. 4 is a section view of a focus lens drive mechanism in a zoom lens barrel according to the invention.
Figure 5:
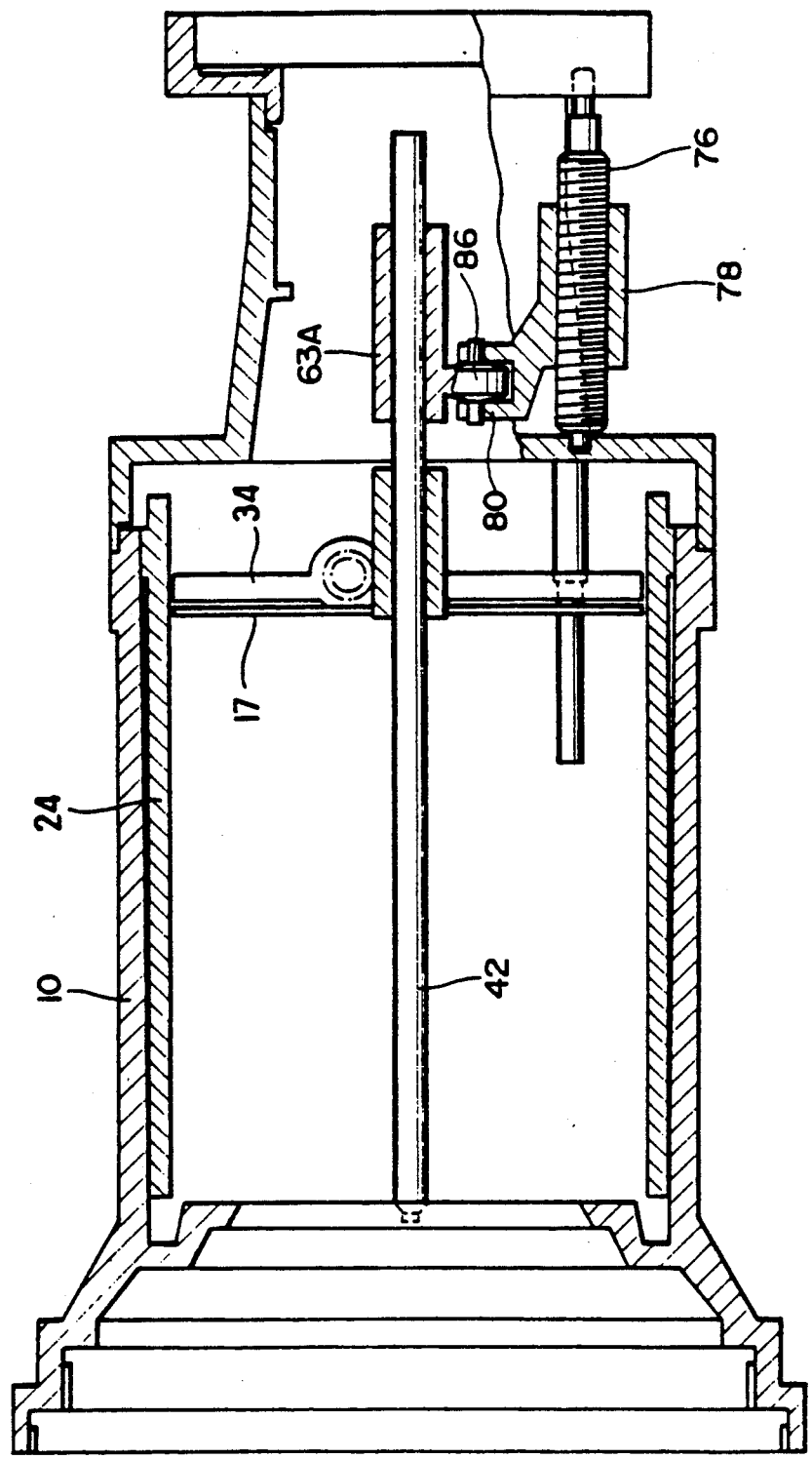
FIG. 5 is a section view of the focus lens drive mechanism shown in FIG. 4, but viewed from a different angle.
Figure 6:
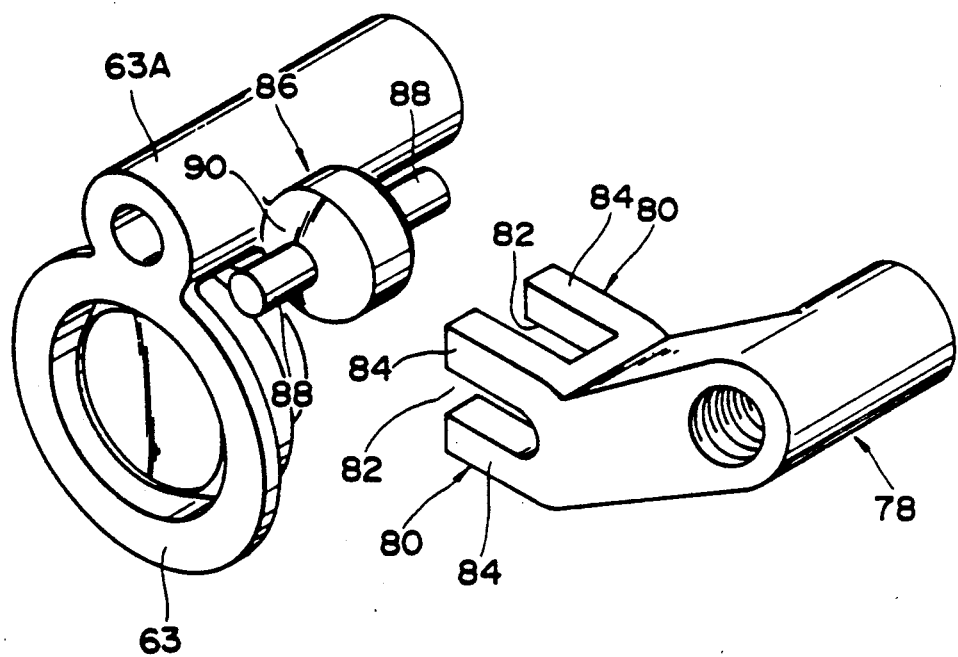
FIG. 6 is a perspective view of the structure of a connecting portion of a focus lens drive mechanism according to the invention.

Next, description will be given below of a drive mechanism for the focus lens. As shown in FIG. 4, a focus motor 68 is mounted to the fixed barrel 10 which has an output shaft. A pulley 70 is provided on the output shaft of the focus motor 68 and a belt 72 is extended over the pulley 70, which belt 72 is used to rotate the pulley 70. A threaded shaft 76 is fixedly secured to the pulley 74 and a nut member 78 is threadedly engaged with the threaded shaft 76. The nut member 78 includes a pair of forked engagement portions 80, as shown in FIGS. 5 and 6. The nut member further includes elongated bores 82 and 82 respectively formed between the pair of forked engagement portions 80, and engagement pieces 84 and 84 which can be deformed elastically. A connecting piece 86 formed integrally with the focus lens frame 63, which connecting piece 86 is shown in FIGS. 5 and 6, is engageable with forked engagement portions 82. In other words, the connecting piece 86 includes two pins 88, 88 and a spherical top. To mount the connecting piece 86 to the nut member 78, the two pins 88, 88 are inserted into the elongated bores 82, 82 between the pair of forked engagement portions 80, respectively, and at the same time the spherical top 90 is inserted into grooves formed between the engagement pieces 84 and 84. This completes assembling of a connecting structure which is shown in FIG. 5.

In the thus assembled connecting structure, a rotational force from the motor 68 is transmitted to the threaded shaft 76 to thereby move the nut member 78 back and forth. As a result of the back and forth movement of the nut member 78, the nut member 78 and the focus lens frame 63 can be connected with each other by means of a spherical structure For this reason, the spherical contact portion of the spherical structure can absorb a deviation in parallelism between the threaded shaft 76 and guide bars 40, 42, if any, so that the movement of the nut member 78 will never be obstructed. Also, due to the fact that the pins 88, 88 are inserted into the elongated bores 82, 82, the rotational movement of the nut member is prevented.

Referring back again to FIG. 1, in the rear of the focus moving lens 18, the second fixed lens group 20 is fixedly secured to the fixed barrel 10 through a lens frame 79.

As shown in FIG. 1, in the rear portion of the fixed barrel 10, there is disposed a low pass filter 92 and, backwardly of the low pass filter 92, there is disposed a CCD 94.

Figure 8:
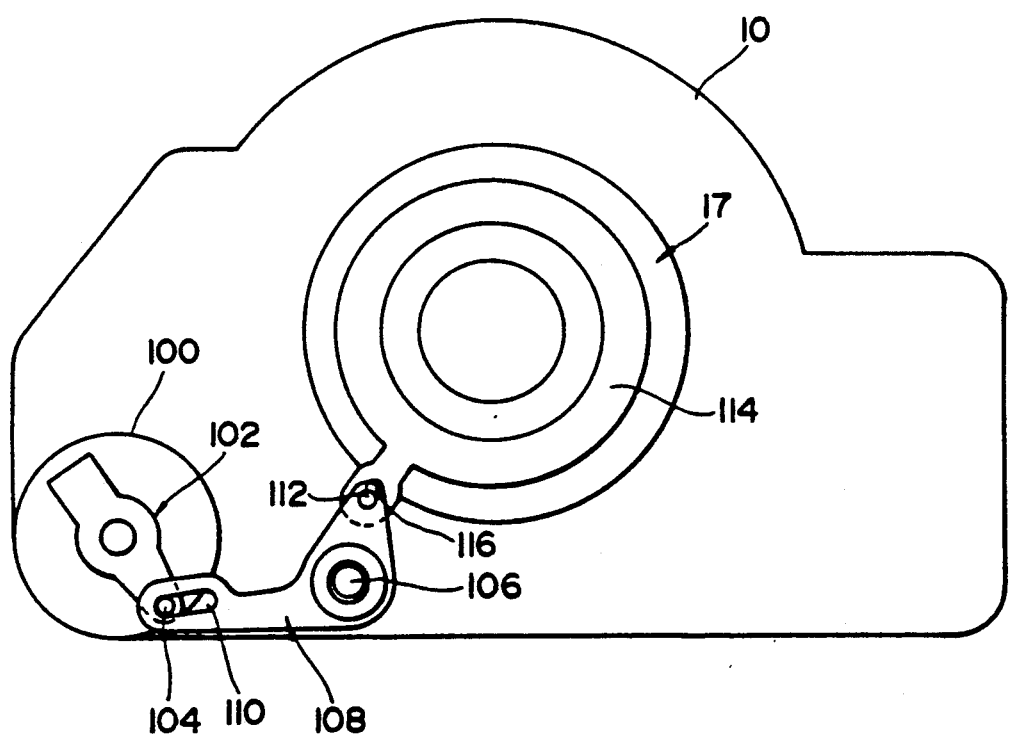
FIG. 8 is an explanatory view of a mechanism for driving a diaphragm plate.

Now, in FIGS. 4 and 8, there is shown a drive mechanism for driving the diaphragm plate 17 In particular, the drive mechanism includes an iris meter 100 which has an output shaft. A lever 102 is disposed on the output shaft of the iris meter 100 and a pin 104 is mounted on and projected from the top end of the lever 102. On the other hand, a lever 108 is journaled to the fixed barrel 10 through a shaft 106, which lever 108 includes an elongated bore 110 formed in one end portion thereof. The pin 104 of the lever 102 is fitted into the elongated bore 110 of the lever 108. In the other end portion of the lever 108 a pin 112 is projectingly provided. The pin 112 is fitted into an elongated bore 116 formed in a rotary ring 114 provided in the diaphragm plate 17. A plurality of diaphragm vanes (not shown) each having a well-known structure are journaled to the rotary ring 114.

In FIG. 8, if the lever 102 of the iris meter 100 is rotated according to the environmental brightnesses, then the lever 108 is rotated to thereby rotate the rotary ring 114. This causes the diaphragm vanes (not shown) to be opened and closed, thereby determining the degree of opening of the diaphragm. Here, while the diaphragm plate 17 is moved together with the second zoom moving lens frame 34, the pin 112 remains fitted in the elongated bore 116 of the rotary ring 114, so that the engagement between the lever 108 and diaphragm plate 17 is maintained. According to the illustrated embodiment of the invention, the diaphragm plate 17 is in engagement with the lever 102 of the iris meter 100, not directly but through the lever 108, so that the lever 102 can be made compact which is advantageous in improving accuracy.

In the zoom lens barrel of the invention constructed in the above-mentioned manner, if the zoom ring 26 is driven by a motor (not shown) and thus the cam barrel 24 is rotated, then the zoom lens groups 14 and 16 are moved in such a manner as shown by one-dot chained lines in FIG. 1 to thereby perform a zooming operation.

Also, the motor 68 is rotatively driven to move the focus lens frame 63 so as to perform a focus adjusting operation.

The photograph picture image light passes through the low-pass filter 92 and is then picked up by the CCD 94.

Figure 9A:
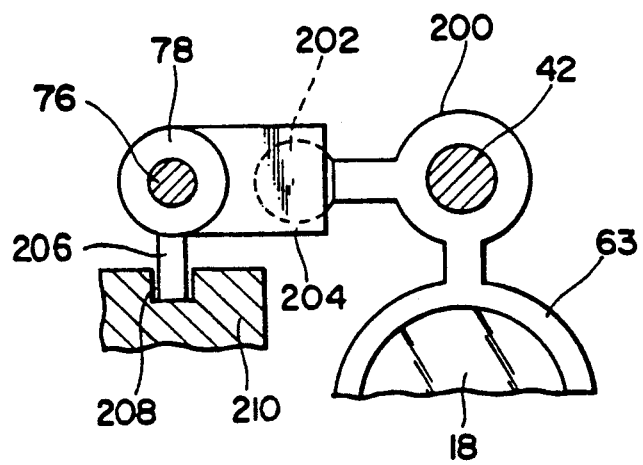
FIGS. 9(A) and (B) are respectively views of another embodiment of a zoom lens barrel according to the invention; and, FIGS. 10(A) and (B) are respectively views of still another embodiment of a zoom lens barrel according to the invention.
Figure 9B:
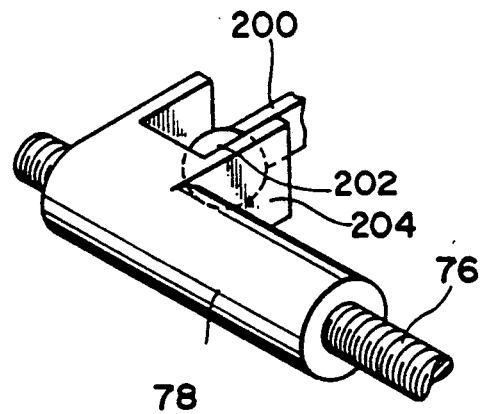

Referring now to FIGS. 9 (A) and 9 (B), there is shown a further embodiment of a zoom lens device according to the present invention. In this embodiment, a member 200 formed integrally with the focus lens frame 63 includes a sphere 202. The sphere 202 is fitted into a fork-like portion 204 formed integrally with the nut member 78. Prevention of rotation of the nut member 78 is achieved by fitting a pin 206 extending from the nut member 78 into an elongated groove 208 formed in a main body 210. In this embodiment as well, there is employed a spherical connection which allows absorption of any deviation in parallelism between the threaded shaft 76 and the guide bar 42.

Figure 10A:
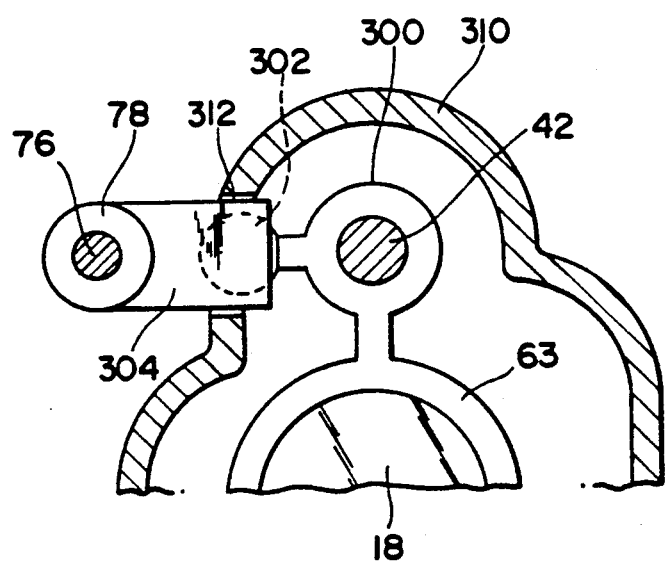
Figure 10B:
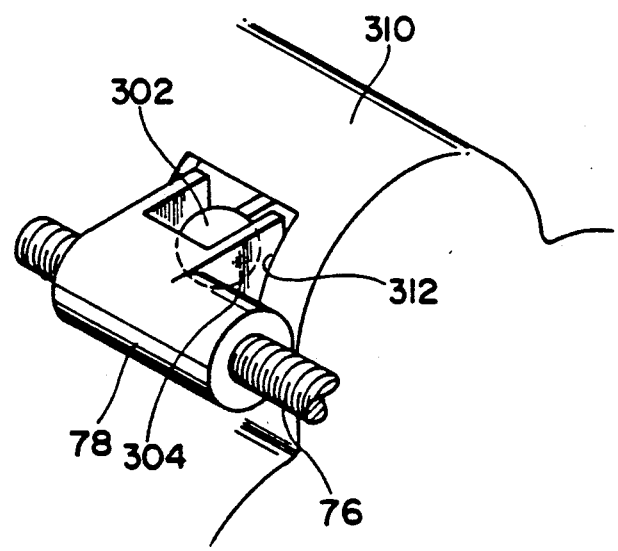

In FIGS. 10 (A) and 10 (B), there is shown a still further embodiment of a zoom lens device according to the present invention. In this embodiment, a main body 310. includes a window 312. The fork-like portion 304 of the nut member 78 can be positioned in the window 312 to prevent the rotation of the nut member 78. In this embodiment, other structures are similar to those in the embodiment shown in FIGS. 9 (A) and 9 (B). In other words, the spherical connection between the sphere 302 of the member 300 and the fork-like portion 304 of the nut member 78 allows absorption of any deviation in parallelism between the threaded shaft 76 and the guide bar 42.

According to the present invention, a wide zoom angle can be realized without increasing the size of a lens barrel and zooming of high magnification can be realized by use of a compact zoom lens barrel. Also, there are eliminated the need for working of a clearance groove in a fixed barrel, working of a threaded groove for connection with a cam barrel, and the like, and the working man-hour can be reduced.

According to the present invention, the first guide bar is used to guide the first lens frame and to prevent the swinging of the second lens frame, and the second guide bar is used to guide the second lens frame and to prevent the swinging of the first lens frame. Due to this, there is eliminated the need for provision of a swing-preventive special bar which has been required conventionally, and also there is eliminated the need for working of a recess.

According to the present invention, due to the fact that the diaphragm member is disposed on the front surface of the second zoom moving lens to thereby allow the diaphragm member to move back and forth together with the second zoom moving lens, and also that an inner focus system is employed and thus the focus moving lens group is interposed between the zoom lens group and the second fixed lens group, a high magnification can be obtained in spite of a compact zoom lens barrel.

According to the present invention, due to the fact that the spherical portion of the moving lens frame is fitted into the fork-like engagement portion of the nut member and the nut member and the moving lens frame are in spherical connection with each other, any deviation in parallelism between the guide bar of the moving lens frame and the threaded shaft can be absorbed without using any torsion spring.

According to the invention, the moving lens frame of the focus lens system is guided by the guide bar of the zoom lens system, so that the optical axes of the zoom and focus lens systems can be adjusted with ease and also the common use of the guide bar allows reduction of the number of parts.

According to the invention, the guide bars, follower pins and the like are disposed above and below the taking lens and the fixed diaphragm piece is formed above and below the front surface of the taking lens barrel, whereby the fixed diaphragm piece prevents entrance of unnecessary light. Also, the fixed diaphragm piece can be used to support the guide bars, so that the number of parts required can be decreased.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A zoom lens barrel comprising:

a fixed barrel;

a cam barrel having first and second cam grooves and supported rotatably within the fixed barrel;

a first zoom lens frame having a first follower pin fittable into said first cam groove in said cam barrel, and movable back and forth by means of rotation of said cam barrel;

a second zoom lens frame having a second follower pin fittable into said second cam groove in said cam barrel, and movable back and forth by means of rotation of said cam barrel; and, a zoom ring fixedly secured to the rear end of said cam barrel and exposed out from said fixed barrel disposed outside.

2. A zoom lens device as set forth in claim 1, wherein a first zoom lens group provided in said first zoom lens frame and a second zoom lens group provided in said second zoom lens frame cooperate in forming a zoom lens system, and wherein a focus lens group in a focus lens frame can be guided by a guide bar guiding said first zoom lens frame and another guide bar guiding said second zoom lens frame.

3. A zoom lens device comprising:
a fixed barrel;
a cam barrel having first and second cam grooves and supported rotatablY within said fixed barrel;
a first zoom lens frame having a first follower pin fittable into said first cam groove in said cam barrel, and movable back and forth by means of rotation of said cam barrel;
a second zoom lens frame having a second follower pin fittable into said second cam groove in said cam barrel, and movable back and forth by means of rotation of said cam barrel;
a first guide bar mounted to said fixed barrel in the axial direction thereof, fittable into a guide hole formed in said first zoom lens frame, and fittable into a swing-preventive recessed portion formed in said second zoom lens frame; and,
a second guide bar mounted to said fixed barrel in the axial direction thereof, fittable into a guide hole formed in said second zoom lens frame, and fittable into a swing-preventive recessed portion formed in said first zoom lens frame.

4. A lens drive mechanism comprising:
a fixed barrel;
a motor disposed in said fixed barrel;
a threaded member connected to said motor;
a nut member threadedly engageable with said threaded member and including a fork-like engagement portion;
a guide bar mounted to said fixed barrel in the axial direction thereof; and,
a moving lens frame including a spherical surface portion engageable with said fork-like engagement portion of said nut member in a spherical contact manner, and guidable by said guide bar.

5. A zoom lens device comprising:
a fixed barrel;
a first fixed lens group disposed in the front portion of said fixed barrel;
a first zoom lens group disposed within said fixed barrel and freely movable back and forth in the rear of said first fixed lens group;

a second zoom lens group disposed within said fixed barrel and freely movable back and forth in the rear of said first zoom lens group;

a diaphragm member disposed on the front surface of said second zoom lens group and movable together with said second zoom lens group;

a focus lens group disposed within said fixed barrel and freely movable in the rear of said second zoom lens group; and, a second fixed lens group disposed in the rear portion of said fixed barrel and in the rear of said focus lens group.

6. A zoom lens device as set forth in claim 5, wherein said focus lens group is guided by guide bars respectively provided in said first and second zoom lens groups.

7. A zoom lens device as set forth in claim 5, further including:
a first guide bar mounted to said fixed barrel in the axial direction thereof, said first guide bar being fittable into a guide hole formed in a lens frame of said first zoom lens group and fittable into a swing preventive recessed portion formed in a lens frame of said second zoom lens group, and
a second guide bar mounted to said fixed barrel in the axial direction thereof, said second guide bar being fittable into a guide hole formed in said lens frame of said second zoom lens group and fittable into a swing preventive recessed portion formed in said lens frame of said first zoom lens group.

8. A zoom lens device as set forth in claim 5, further including:
a motor disposed in said fixed barrel;
a threaded member connected to said motor;
a nut member threadedly engageable with said threaded member and including a fork-like engagement portion; and,
a focus lens frame including a spherical portion engageable with said fork-like engagement portion of said nut member and guidable by a guide bar.

9. A zoom lens device as set forth in claim 5, further including:
guide bars mounted to said fixed barrel in the axial direction thereof and oppositely to each other, said guide bars respectively being fittable into guide holes formed in the lens frames of said first and second zoom lens groups to thereby guide said lens frames; and,
fixed diaphragm pieces mounted to said fixed barrel oppositely to each other for supporting the front end portions of said guide bars.

10. A zoom lens device comprising:
a fixed barrel;
a cam barrel having a cam groove and supported rotatably by said fixed barrel;
a lens frame having a follower pin fittable into said cam groove in said cam barrel, and movable back and forth by means of rotation of said cam groove;
guide bars respectively mounted to said fixed barrel in the axial direction thereof and oppositely to each other, and fittable into guide holes formed in said lens frame to guide said lens frame; and
fixed diaphragm pieces respectively disposed oppositely to each other in said fixed barrel for supporting respective front end portions of said guide bar and for preventing entrance of unnecessary light.

* * * * *